United States Patent
Tsuya

(10) Patent No.: US 7,484,767 B2
(45) Date of Patent: Feb. 3, 2009

(54) MOTORCYCLE

(75) Inventor: Koji Tsuya, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 164 days.

(21) Appl. No.: 11/562,298

(22) Filed: Nov. 21, 2006

(65) Prior Publication Data

US 2007/0125584 A1    Jun. 7, 2007

(30) Foreign Application Priority Data

Nov. 25, 2005    (JP) .............................. 2005-340817

(51) Int. Cl.
B60P 3/22    (2006.01)
(52) U.S. Cl. ................. 280/835; 180/68.2; 180/68.1
(58) Field of Classification Search ................. 280/835; 180/68.2, 68.1, 229
See application file for complete search history.

(56) References Cited

U.S. PATENT DOCUMENTS

| | | | |
|---|---|---|---|
| 4,396,086 A * | 8/1983 | Hattori | 180/229 |
| 4,694,924 A | 9/1987 | Asakura et al. | |
| 5,984,035 A | 11/1999 | Katoh et al. | |
| 7,270,207 B2 * | 9/2007 | Idei et al. | 180/68.3 |
| 7,380,624 B2 * | 6/2008 | Momosaki | 180/68.3 |
| 2003/0000755 A1 | 1/2003 | Schroeder | |
| 2005/0178598 A1 * | 8/2005 | Arnold | 180/229 |

FOREIGN PATENT DOCUMENTS

| | | |
|---|---|---|
| EP | 0437776 A1 | 12/1990 |
| FR | 2405860 A | 5/1979 |
| GB | 2114945 A | 9/1983 |
| JP | 05319340 A | 12/1993 |
| JP | 07228279 A | 8/1995 |
| JP | 2003-112678 | 4/2003 |

OTHER PUBLICATIONS

European Search Report for corresponding European Application No. 06023666.8 lists the references above.
European Search Report for corresponding European Application No. 06024408.4 lists the references above.

* cited by examiner

Primary Examiner—Paul N Dickson
Assistant Examiner—Tashiana Adams
(74) Attorney, Agent, or Firm—Hogan & Hartson LLP

(57) ABSTRACT

A bottom portion of a fuel tank of a motorcycle is prevented from being heated by engine heat to avoid an increase in fuel temperature. The fuel tank is behind and above the engine and a seat is behind the fuel tank. The seat includes a seat frame attached to the body frame and extending rearward, and a seat cushion mounted on the seat frame. The seat frame has an air introduction opening formed behind the seat cushion, and defines an air passage for guiding air introduced from the air introduction opening toward a bottom wall of the fuel tank.

9 Claims, 9 Drawing Sheets

[FIG. 1]
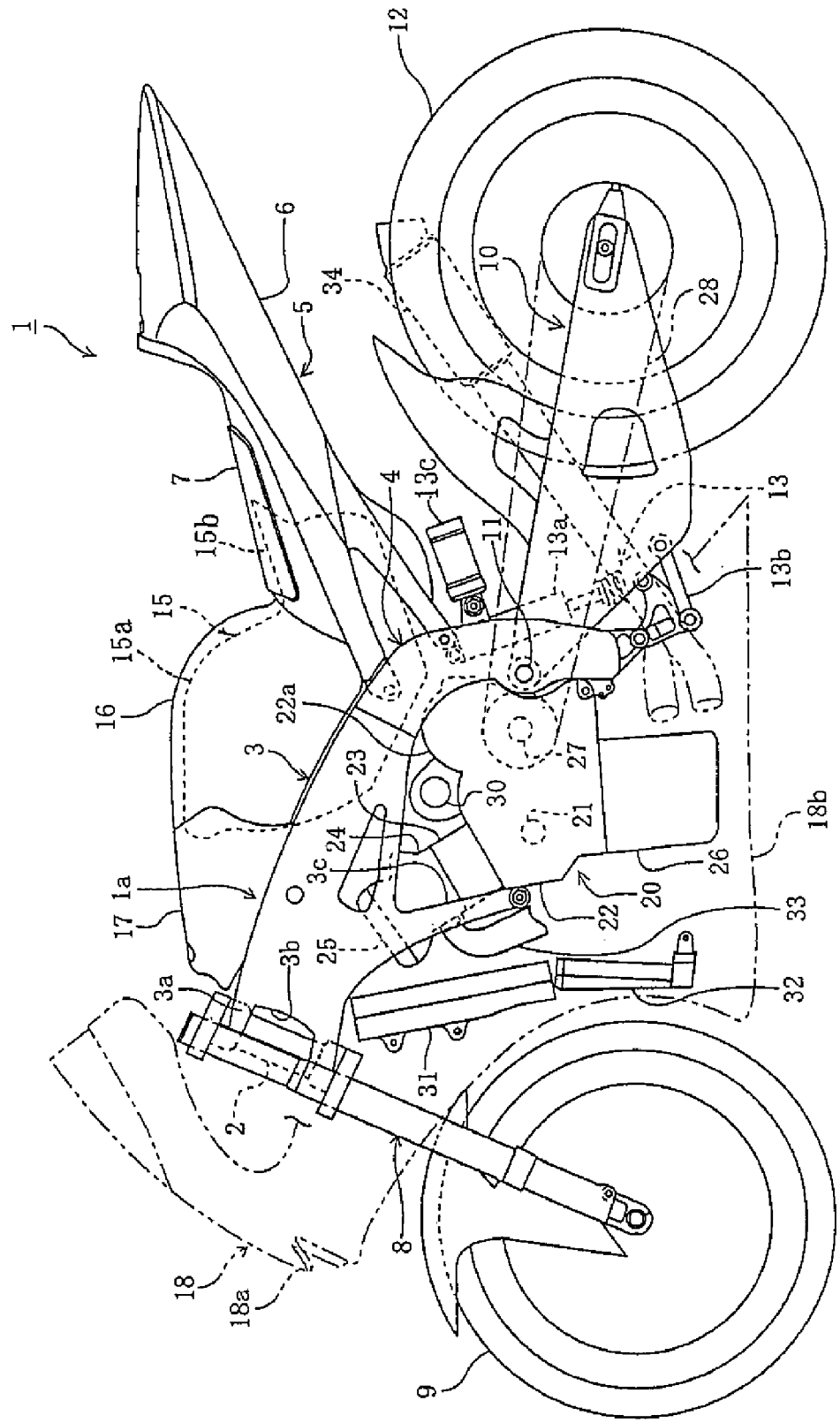

[FIG. 2]
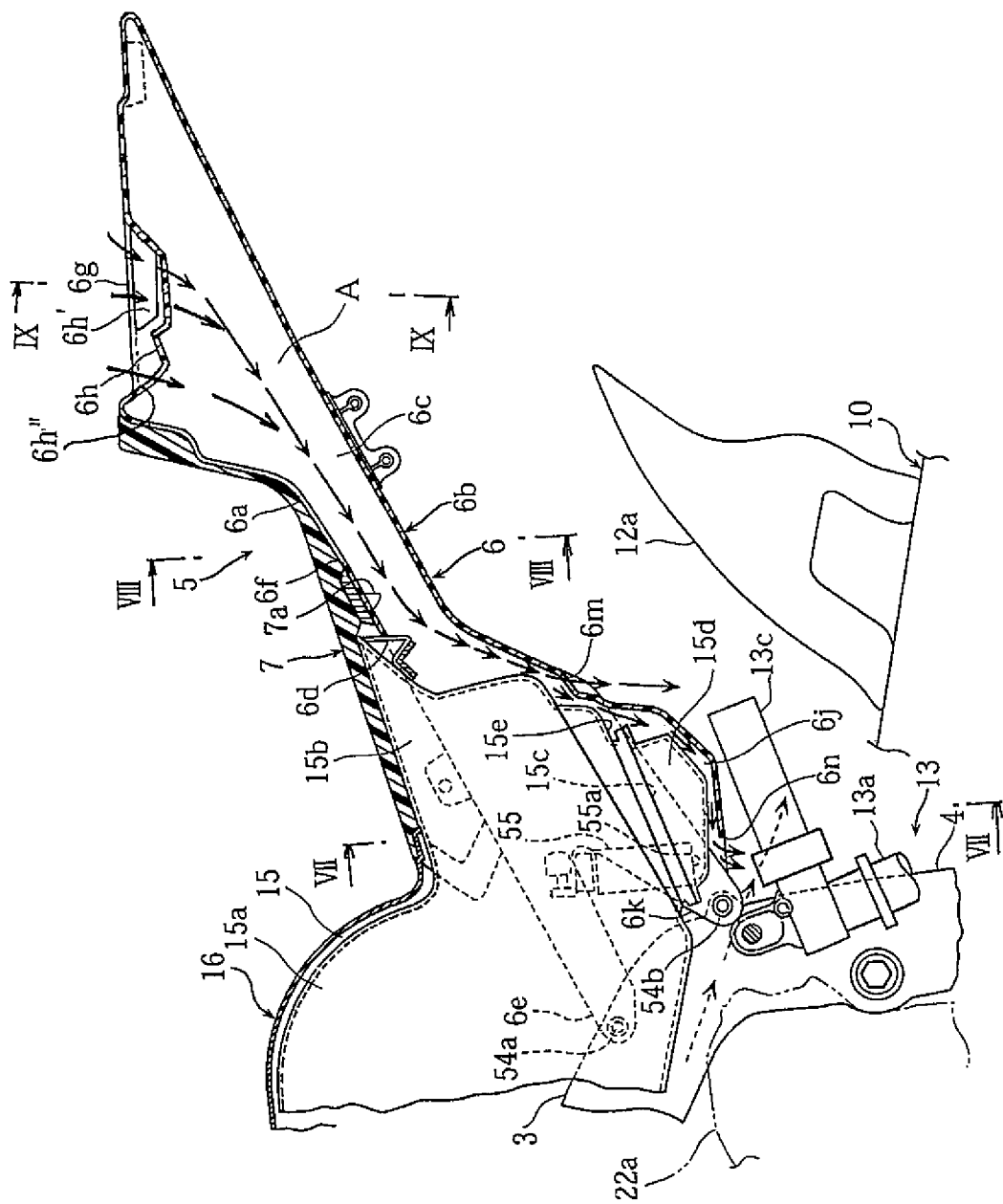

[FIG. 3]
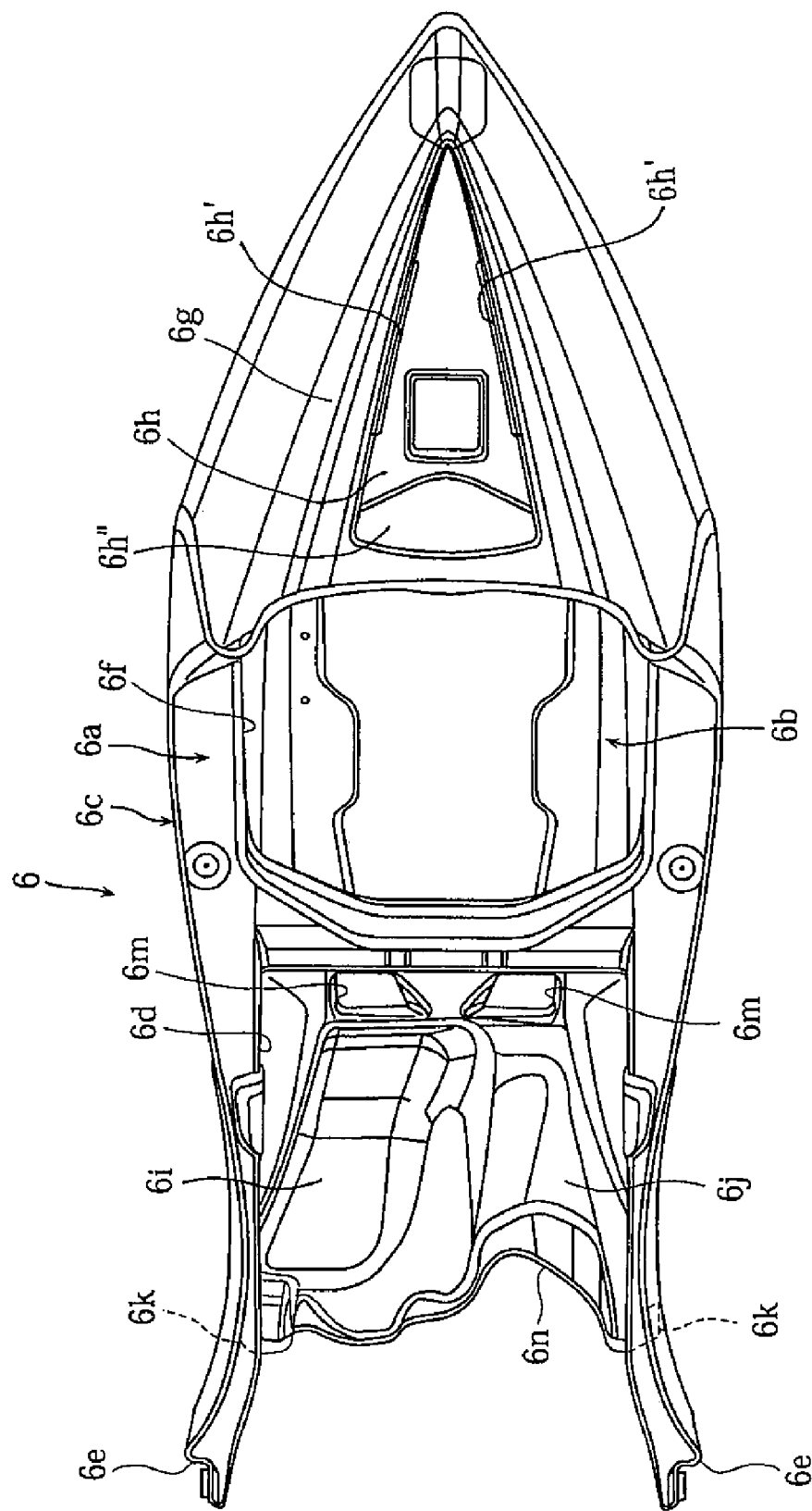

[FIG. 4]
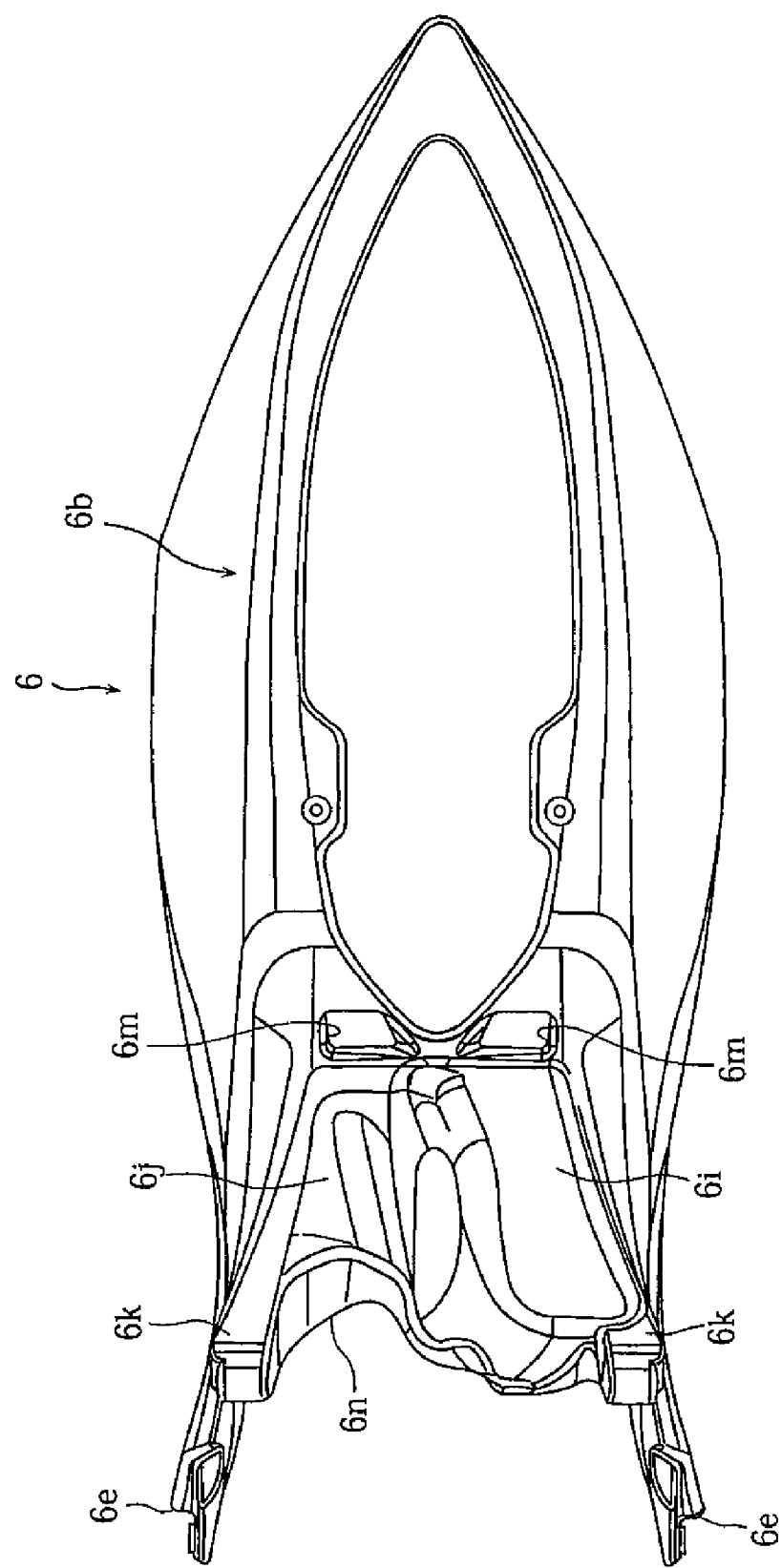

[FIG. 5]
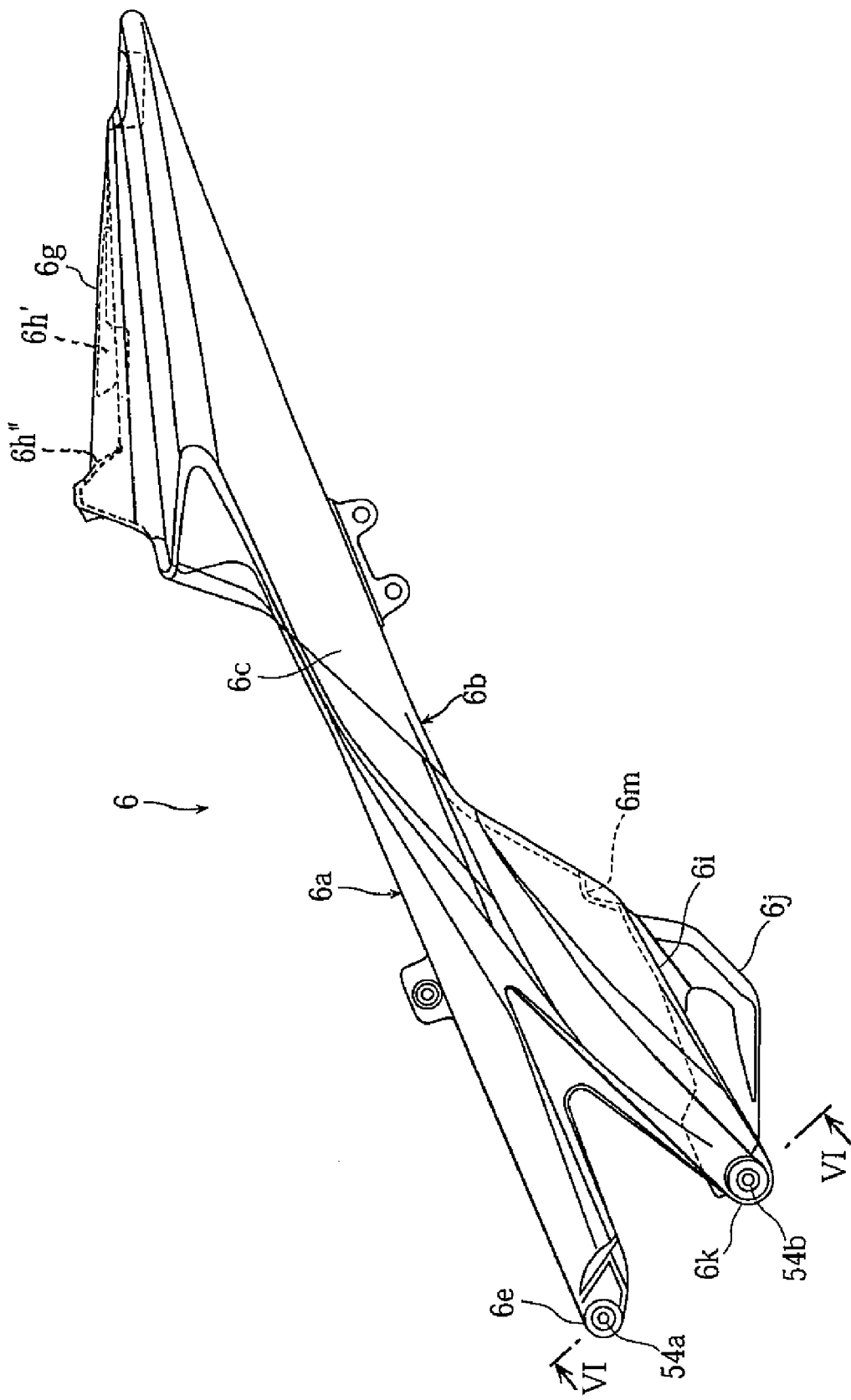

[FIG. 6]
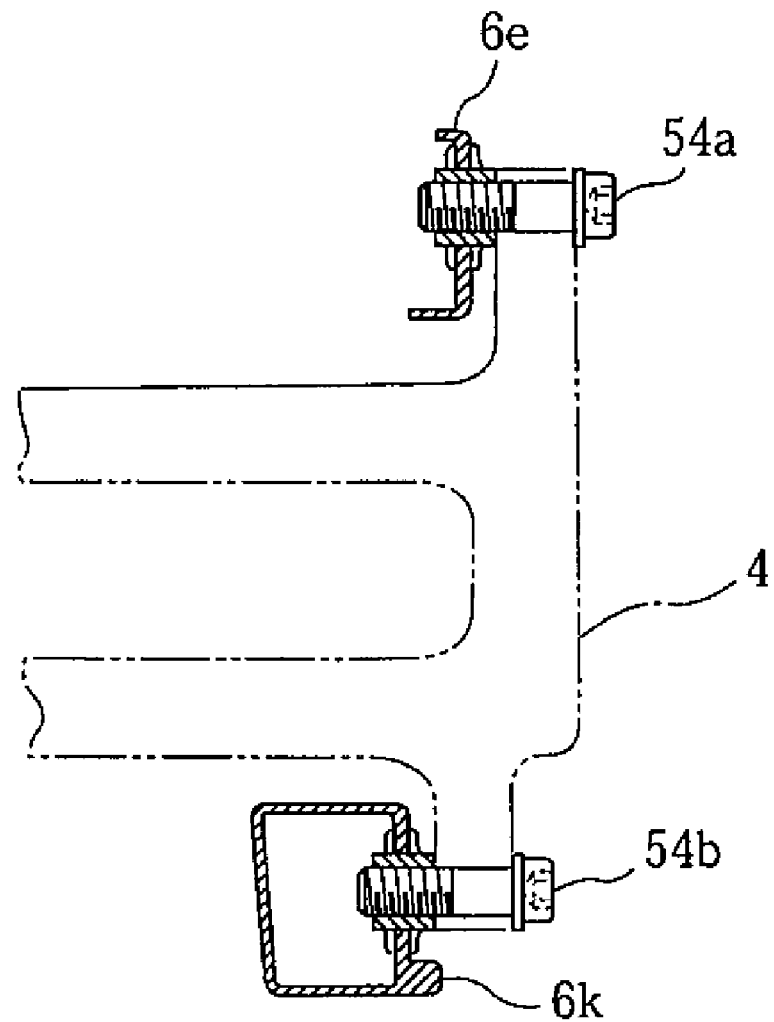

[FIG. 7]
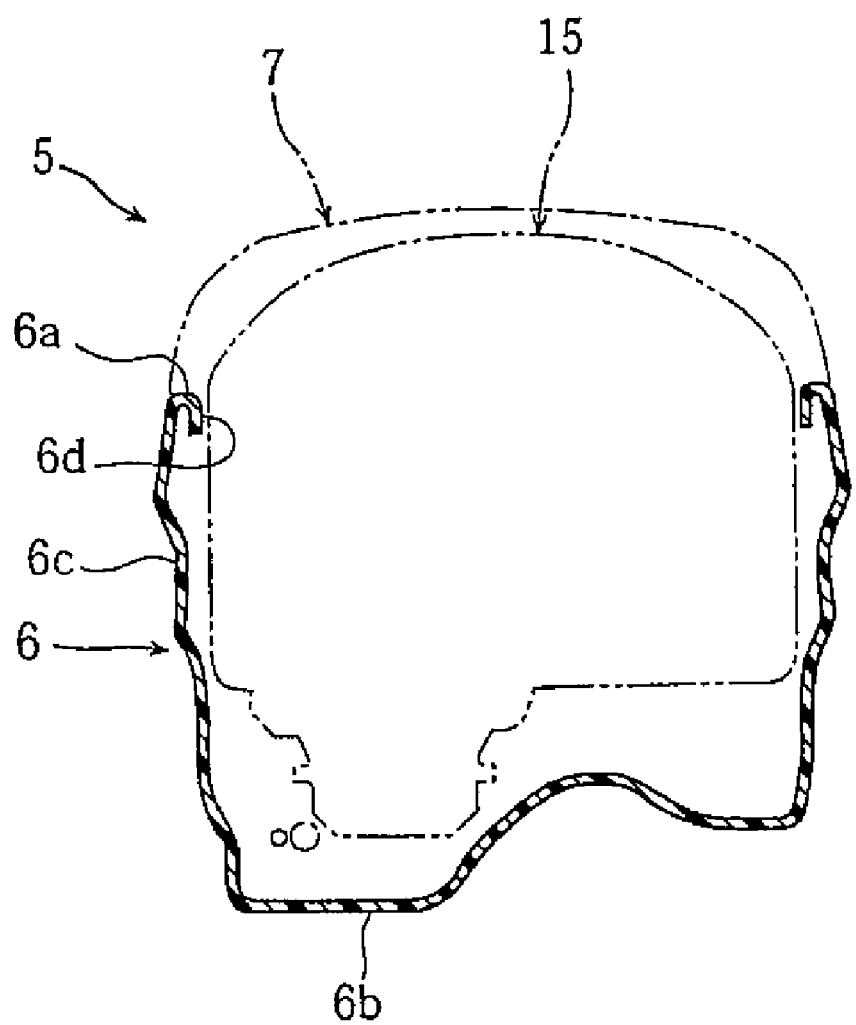

[FIG. 8]
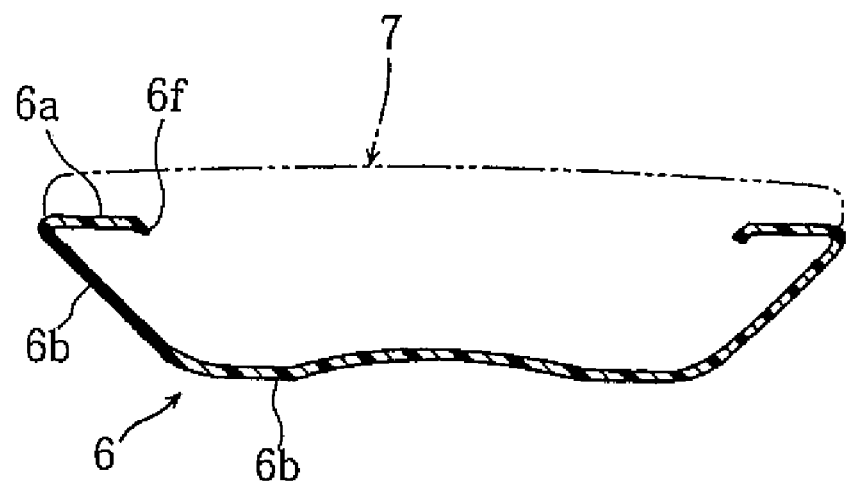

[FIG. 9]
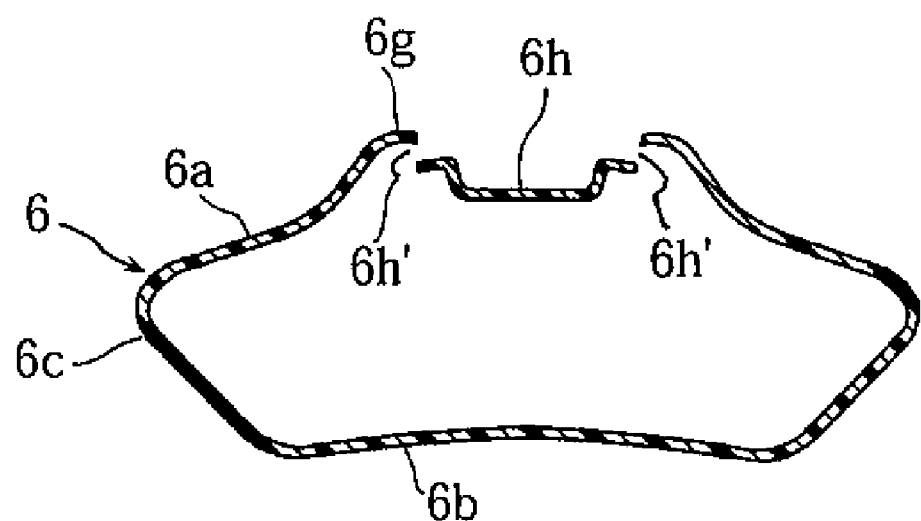

MOTORCYCLE

RELATED APPLICATIONS

This application claims the benefit of priority under 35 USC 119 of Japanese patent application no. 2005-340817, filed on Nov. 25, 2005, which application is hereby incorporated by reference in its entirety.

BACKGROUND OF THE INVENTION

1. Field of the Invention

The present invention relates to a motorcycle, and more specifically to a cooling structure that avoids an increase in temperature of a fuel tank mounted above the engine.

2. Description of Related Art

Motorcycles are generally constructed such that an engine is suspended from and supported by a lower central part of a body frame; a fuel tank is mounted above the engine; and a seat is disposed behind the fuel tank (see JP-A-2003-112678).

When the engine and the fuel tank are mounted in this conventional positional relationship, a bottom portion of the fuel tank is heated by engine heat, resulting in an increase in the temperature of fuel in the fuel tank. Conventionally, to avoid an increase in the fuel temperature, a heat insulation sheet or the like must be provided to cover the bottom portion of the fuel tank.

SUMMARY OF THE INVENTION

The present invention provides a motorcycle in which a bottom portion of a fuel tank is prevented from being heated by engine heat to thereby avoid an increase in the temperature of the fuel.

When a rider drives a motorcycle, a negative pressure area develops behind the rider due to running wind. Air forced into the negative pressure area will hit the surface of the seat frame behind the rider. A positive pressure area thus develops on the surface of such part, and another negative pressure area develops between the bottom wall of the fuel tank and the upper face of a crankcase of the engine. The present invention provides a passage communicating the positive pressure area and the negative pressure areas to thereby form an airflow from behind the rider toward the bottom of the fuel tank.

Accordingly, the present invention provides a motorcycle including a body frame, an engine suspended from and supported by a lower part of the body frame, a fuel tank mounted on the body frame behind and above the engine and a seat disposed behind the fuel tank. The seat includes a seat frame attached to the body frame and extending rearward and a seat cushion mounted on the seat frame. The seat frame has an air introduction opening formed behind the seat cushion, and defines an air passage for guiding air introduced from the air introduction opening toward a bottom wall of the fuel tank.

A positive pressure area develops on a surface of the seat frame behind the seat cushion under the influence of a running wind, and a negative pressure area develops between the bottom portion of the fuel tank and the engine. An air introduction opening is formed in the part of the seat frame behind the seat cushion, and an air passage is formed extending from the air introduction opening toward the bottom wall of the fuel tank to guide air from the air introduction opening through the air passage toward the bottom wall of the fuel tank, to thereby cool the bottom portion of the fuel tank. The air is ambient air under no influence of engine heat or the like, which effects reliable cooling of the bottom portion of the fuel tank. While it is possible to use the air flowing between the engine and the bottom portion of the fuel tank to cool the. fuel tank, such air might be hot due to engine heat and provides less cooling effect.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the present invention.

FIG. 2 is a sectional side view illustrating an air passage defined by a seat frame of the motorcycle.

FIG. 3 is a plan view of the seat frame in FIG. 2.

FIG. 4 is a bottom view of the seat frame in FIG. 2.

FIG. 5 is a side view of the seat frame in FIG. 2.

FIG. 6 is a sectional front view of vehicle body mounting parts of the seat frame taken along line VI-VI in FIG. 5.

FIG. 7 is a sectional front view of the seat frame taken along line VII-VII in FIG. 2.

FIG. 8 is a sectional front view of the seat frame taken along line VIII-VIII in FIG. 2.

FIG. 9 is a sectional front view of the seat frame taken along line IX-IX in FIG. 2.

DETAILED DESCRIPTION OF THE INVENTION

An embodiment of the present invention is now described with reference to the accompanying drawings.

FIGS. 1-7 illustrate a motorcycle according to an embodiment of the present invention. In this description, the terms "front", "rear", "left" and "right" mean the front, rear, left and right directions from the perspective of a rider on the seat.

In the figures, reference numeral 1 denotes a motorcycle. A front wheel 9 and a rear wheel 12 are disposed forward and rearward of a body frame 1a. An engine 20 is suspended from and supported by a lower part of the body frame 1a. A cowling 18 surrounds the front, left and right sides of the engine 20.

The body frame 1a includes a head pipe 2; left and right tank rails 3, 3 extending from the head pipe 2 obliquely downward and rearward; and left and right rear arm brackets 4, 4 extending from the rear ends of the tank rails 3, 3 downward. A seat 5 is attached to the rear arm brackets 4, 4.

A front fork 8 is supported by the head pipe 2 in a manner to rotate to the left and right. The front wheel 9 is rotatably supported at the lower end of the front fork 8, and an upper part of the front fork has steering handlebars (not shown) attached thereto.

A rear arm 10 is supported by vertical central parts of the rear arm brackets 4 via a pivot shaft 11 for up-and-down pivotal movement, and the rear wheel 12 is rotatably supported at the rear end of the rear arm 10. A rear suspension 13 including a cushion unit 13a and a link mechanism 13 is disposed between the rear arm 10 and the rear arm brackets 4, 4.

A fuel tank 15 extends between and is mounted to the tank rails 3, 3. The fuel tank 15 includes a main part 15a located between the tank rails 3, 3 and above the rear ends thereof, and an extension 15b extending from the main part 15a obliquely upward and rearward The fuel tank 15 is generally located behind and above the engine 20, with its large part projecting upward from tank rails 3, 3.

The extension 15b has a bottom 15e with an opening 15c that is formed on one side in a vehicle width direction (the left side in this embodiment). The peripheral edge of the opening 15c has an oil collecting section 15d removably attached thereto that protrudes downward and has a bowl shape. A suction port 55a of a fuel pump 55 designed to be included in a tank is located in the oil collecting section 15d.

The fuel tank 15 has a tank cover 16 attached thereto for covering an upper portion of the fuel tank 15. A top cover 17 covers a forward part of the fuel tank 15 between the tank rails 3, 3 from above.

The tank cover 16 is attached to the fuel tank 15. The top cover 17 is removably and independently attached to the tank cover 16.

The tank rails 3, 3 have a height larger than a width in the vehicle width direction to form a vertically extending rectangular shape when viewed in a cross sectional view. In the vicinity of the head pipe 2, the tank rails 3, 3 are formed such that the distance in the vehicle width direction between them decreases as it comes closer to the head pipe 2, and the front ends 3a of the tank rails are welded to the head pipe 2. The forward portions of the tank rails 3, 3 are formed together with an under frame part 3c inclined downward and rearward along a side of the engine 20.

The cowling 18 includes a front part 18a for covering the front side of the head pipe 2, and side parts 18b, 18b for covering the lower peripheries of the tank rails 3, 3 and the left and right sides of the engine 20. The front part 18a has an opening 18c for introducing running wind into a space defined by the cowling 18.

The engine 20 is preferably a water-cooled, four-stroke, in-line, four-cylinder engine. The engine 20 is constructed such that a cylinder block 23, a cylinder head 24, and a head cover 25, which are common between the four cylinders, are mounted on top of each other and bolted to an upper joining face of a crankcase 22 with a crankshaft 21 housed therein; and an oil sump 26 is connected to a lower joining face of the crankcase 22.

A rear portion of the crankcase 22 is formed together with a transmission case 22a having a shift mechanism (not shown) included therein. The transmission case 22a has an output shaft 27 disposed therein for taking out engine power, which is transmitted from the output shaft 27 to the rear wheel 12 via. a chain belt 28 for the rotation of the rear wheel 12.

Upper and lower radiators 31, 32 are disposed in front of the engine 20 for keeping engine coolant at a certain temperature. An alternator (generator) 30 is disposed immediately behind the engine 20 and faces the bottom of the fuel tank 15.

An exhaust system of the engine 20 includes four exhaust pipes 33 connected to respective exhaust ports, which are formed in the forward wall of the cylinder head 24 for the respective cylinders, and extending downward from the forward wall of the cylinder head 24, passing the lower side of the engine 20 and then extending rearward; and a muffler 34 connected to the exhaust pipes 33 and disposed on the right side of the rear wheel 12.

An ECU 4 for controlling the operating states of the engine 20, and electrical accessories such as a regulator for controlling the charge level of electric current generated by the alternator 30, are provided in a space defined by the top cover 17 Removing the top cover 17 permits the inspection and maintenance of the electrical accessories.

The seat 5 includes a resinous seat frame 6 attached to the upper ends of the rear arm brackets 4, 4 and extending obliquely upward and rearward; and a resinous seat cushion 7 disposed on the seat frame 6.

The seat frame 6 is a tubular member, with a front portion in a substantially rectangular shape when viewed in a cross sectional view (see FIG. 7) and a central portion and a rear portion both in a laterally extending elliptical shape when viewed in a cross sectional view (see FIGS. 8 and 9). The seat frame includes a top wall 6a, a bottom wall 6b, and side walls 6c each having a curved surface and extending between and connected to the side ends of the walls 6a, 6b into one body.

A front portion of the top wall 6a has a rectangular cutout 6d. The extension 15b of the fuel tank 15 is disposed within a space defined by the cutout. Left and right upper attachment arm parts 6e, 6e are formed on the left and right edges of the cutout 6d so as to extend forward. The upper attachment arm parts 6e, 6e are rigidly secured to rear arm brackets 4, 4 toward upper ends thereof with bolts 54a.

The top wall 6a has a substantially rectangular opening 6f behind the cutout 6d and at a substantially central portion in the longitudinal direction of the top wall 6a. A rear stepped portion 6g defines a rear portion of the top wall 6a and is located behind the opening 6f. The rear stepped portion 6g is located above the opening 6f and has a recess 6h of a substantially triangular shape when viewed in a plan view. The vertical wall of the recess 6h has air introduction openings 6h'. The bottom wall of the recess 6h also has an air introduction opening 6h" at its front end.

The seat cushion 7 is in a flat shape, selectively covers and uncovers the opening 6f, and covers the extension 15b of the fuel tank 15. Seat cushion 7 can be selectively attached and removed by bringing a retaining lug 7a at a bottom face thereof into and out of engagement with a retained hole of the top wall 6a. The seat cushion 7 presses against the extension 15b with a rider's weight when the rider is seated on the seat cushion.

The bottom wall 6b generally extends obliquely upward and rearward substantially in a straight line when viewed in a side view. A front portion of the bottom wall has a stepped-down portion 6i that is formed in a stepped-down manner so as to cover the bottom 15e of the extension 15b of the fuel tank 15 in spaced-apart relationship from the bottom 15e. The stepped-down portion 6i toward its rear end has a pair of left and right air outlets 6m, 6m. The air outlets 6m face the rear end of the bottom 15e of the extension 15b.

The left and right ends of the stepped-down portion 6i are respectively formed with left and right lower attachment arm parts 6k, 6k extending forward. The lower attachment arm parts 6k, 6k are rigidly secured to substantially central parts in the vertical direction of the left and right rear arm brackets 4, 4 with bolts 54b.

The stepped-down portion 6i is formed with a protruded portion 6j for covering the bottom of the oil collecting section 15d in spaced-apart relationship from the bottom. The protruded portion is located on the left side in the vehicle width direction and protrudes downward. The front end of the protruded portion 6j has a cutout 6n positioned slightly rearward from the front end of the stepped-down portion 6i. The forward edge of the cutout 6n is also positioned slightly rearward from the front end of the oil collecting section 15d of the fuel tank 15.

The upper attachment arm part 6e and the lower attachment arm part 6k are formed in a bifurcated configuration when viewed in a side view. The left and right lower attachment parts 6k, 6k are joined together by the stepped-down portion 6i including the protruded portion 6j formed in the front portion of the bottom wall 6b. In other words, the left and right lower attachment arm parts 6k, 6k are securely connected together by the stepped-down portion 6i formed in the front portion of the bottom wall, so that the rigidity of the entire seat frame 6 is significantly increased.

The rear arm 10 has a rear fender 12a attached thereto that covers the rear wheel 12. The bottom wall 6b of the seat frame 6 extends along the rear fender 12a.

In this embodiment, when a rider straddling the seat cushion 7 drives the vehicle at high speeds, a negative pressure area develops behind the rider due to a running wind. Air is thus forced into the negative pressure area from the outside thereof, and as the forced-in air hits the rear stepped portion 6g of the seat frame 6 behind the rider, a positive pressure area develops on the rear stepped portion 6g. Meanwhile, another negative pressure area develops between the bottom wall of the fuel tank 15 and the upper faces of the crankcase 22 and the transmission case 22a under the influence of running wind indicated by broken lines in FIG. 2. Therefore, a passage is formed communicating the positive pressure area and the negative pressure areas to provide an airflow from behind the rider toward the bottom of the fuel tank and to thus cool fuel tank 15 from the outside of its bottom portion.

More specifically, the air introduced from the air introduction openings 6h' and 6h" formed behind the seat cushion 7 flows through a space defined by the seat frame 6 toward the bottom 15e of the fuel tank 15, through spaces between the bottom 15e and the stepped-down portion 6i and between the oil collecting section 15d and the protruded portion 6j, and then runs down to the outside from the front end of the bottom wall 6b. The bottom portion of the fuel tank 15 is thus reliably cooled by ambient air under no influence of engine heat or the like.

The oil collecting section 15d protrudes downward, so that the surface area thereof subjected to the air relatively increases to effect more reliable cooling. Since the protruded portion 6j has the cutout 6n at its front end, a larger volume of air is forced out of the cutout to specifically cool the oil collecting section 15d. Since fuel pump 55 is attached to the oil collecting section 15d, the fuel in the oil collection section 15d increases in temperature due to heat generated by pump 55. The cooling effect of the air, however, avoids an abnormal increase in fuel temperature.

The air that cools the bottom of the fuel tank 15 is made to flow toward the cushion unit 13a and a gas chamber 13c of the rear suspension 13, thereby avoiding an abnormal increase in the temperature of the cushion unit 13a and the like. Since the air outlets 6m are formed near the rear end of the stepped-down portion 6i of the bottom wall 6b, part of the air yet to cool the fuel tank 15, and thus having lower temperature, flows through the outlets 6m and then passes in the vicinity of the gas chamber 13c and the like. This reliably cools the cushion unit 13a and the gas chamber 13c.

Air that passes through the space defined by the seat frame 6 flows rearward while being rectified by the rear fender 12a disposed above the rear wheel 12, which ensures proper airflow.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
a body frame;
an engine suspended from and supported by a lower part of the body frame;
a fuel tank mounted on the body frame behind and above the engine; and
a seat disposed behind the fuel tank and including a seat frame attached to the body frame and extending rearward, and a seat cushion mounted on the seat frame,
wherein the seat frame has an air introduction opening formed behind the seat cushion, and defines an air passage for guiding air introduced from the air introduction opening toward a bottom wall of the fuel tank.

2. The motorcycle according to claim 1, wherein the body frame includes left and right tank rails, and the seat frame has a tubular shape, extends rearward, has a front part attached to the tank rails, and includes: a top wall; a bottom wall; and left and right side walls extending between and connecting the left and right ends of the top wall and the bottom wall in one body,
wherein the air introduction opening is formed in the top wall and behind the seat cushion, and
wherein the bottom wall covers a bottom portion of the fuel tank from below.

3. The motorcycle according to claim 2, wherein a rear cushion is disposed below a forward part of the seat frame, and the bottom wall has an air outlet for guiding the air toward the rear cushion.

4. The motorcycle according to claim 3, wherein the air outlet is formed at a rear end of a stepped-down portion that is formed on the bottom wall.

5. The motorcycle according to claim 2, wherein
the bottom portion of the fuel tank has an oil collecting section protruding downward, and
wherein a portion of the seat frame opposed to the oil collecting section has a protruded portion protruding downward.

6. The motorcycle according to claim 5, wherein a front end of the protruded portion has a cutout recessed rearward.

7. The motorcycle according to claim 2, wherein the top wall of the seat frame has: a top wall cutout formed in a front portion thereof and opened forward; and an opening formed behind the top wall cutout and opened upward, wherein a space defined by the top wall cutout is substantially occupied by a rear portion of the fuel tank, and the opening is covered by the seat cushion.

8. The motorcycle according to claim 2, wherein a front portion of the seat cushion is disposed on an upper face of a rear portion of the fuel tank.

9. The motorcycle according to claim 2, wherein the bottom wall of the seat frame extends along a top face of a rear fender that covers a rear wheel.

* * * * *